(12) United States Patent
Lachica

(10) Patent No.: US 9,440,508 B2
(45) Date of Patent: Sep. 13, 2016

(54) ACTIVE VEHICLE SUSPENSION SYSTEM AND METHOD FOR MANAGING DRIVE ENERGY

(71) Applicant: Seth M. Lachica, Pleasanton, CA (US)

(72) Inventor: Seth M. Lachica, Pleasanton, CA (US)

( * ) Notice: Subject to any disclaimer, the term of this patent is extended or adjusted under 35 U.S.C. 154(b) by 15 days.

(21) Appl. No.: 14/553,919

(22) Filed: Nov. 25, 2014

(65) Prior Publication Data

US 2016/0144682 A1  May 26, 2016

(51) Int. Cl.
*B60G 17/0185* (2006.01)
*B60G 17/0165* (2006.01)
*B60G 17/018* (2006.01)
*B60G 17/019* (2006.01)

(52) U.S. Cl.
CPC ....... *B60G 17/0165* (2013.01); *B60G 17/0182* (2013.01); *B60G 17/01941* (2013.01); *B60G 2600/182* (2013.01); *B60G 2600/73* (2013.01)

(58) Field of Classification Search
CPC .......... B60G 17/0165; B60G 17/0182; B60G 17/01941; B60G 2600/182; B60G 2600/73
See application file for complete search history.

(56) References Cited

U.S. PATENT DOCUMENTS

| | | | |
|---|---|---|---|
| 4,960,290 A | 10/1990 | Bose | |
| 6,945,541 B2 | 9/2005 | Brown | |
| 7,195,250 B2 | 3/2007 | Knox et al. | |
| 7,421,954 B2 | 9/2008 | Bose | |
| 7,427,072 B2 | 9/2008 | Brown | |
| 7,434,816 B2 | 10/2008 | Knox et al. | |
| 7,878,510 B2 | 2/2011 | Knox et al. | |
| 7,962,261 B2 | 6/2011 | Bushko et al. | |
| 8,112,198 B2 | 2/2012 | Parison, Jr. et al. | |
| 8,116,939 B2 | 2/2012 | Kajino et al. | |
| 8,517,395 B2 | 8/2013 | Knox et al. | |
| 2004/0122580 A1* | 6/2004 | Sorrells | G07C 5/008 701/80 |
| 2013/0041545 A1* | 2/2013 | Bar | B60G 17/0162 701/23 |
| 2014/0297117 A1* | 10/2014 | Near | H02K 5/12 701/37 |
| 2015/0290994 A1* | 10/2015 | Dames | B60G 7/008 280/830 |
| 2015/0352921 A1* | 12/2015 | Dames | B60G 17/08 280/5.514 |

OTHER PUBLICATIONS https://www.google.com/search?q=rock+crawler+buggy&espv=2&biw=1356&bih=662&tbm=isch&tbo=u&source=univ&sa=X&ei=Zh51VPDXAYPUoATsvILoBQ&ved=0CB0QsAQ.

* cited by examiner

*Primary Examiner* — Faye M Fleming
(74) *Attorney, Agent, or Firm* — Hamrick IP Law Office; Claude A.S. Hamrick

(57) ABSTRACT

A vehicle drive energy management and active suspension control system and operative methodology in which ground/pathway anomalies are sensed and the relationship thereof to the vehicle chassis is used to enable or automatically effect adjustment of chassis supporting actuators to reduce resisting effects and/or increase assisting effects of the encountered ground/pathway anomalies and thus reduce the vehicle drive energy that would otherwise be required to efficiently move the vehicle in the intended direction, yet maintain the stability of the vehicle.

20 Claims, 8 Drawing Sheets

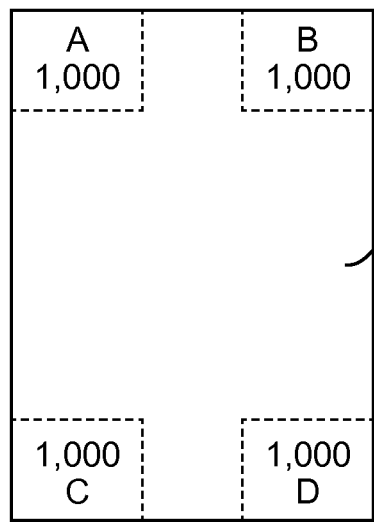 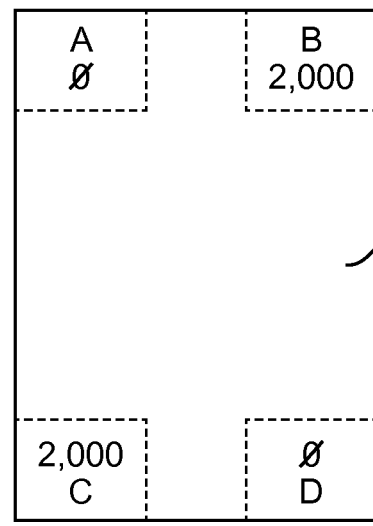
FIG. 1a
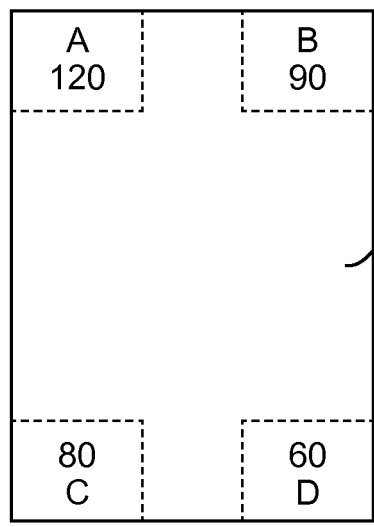 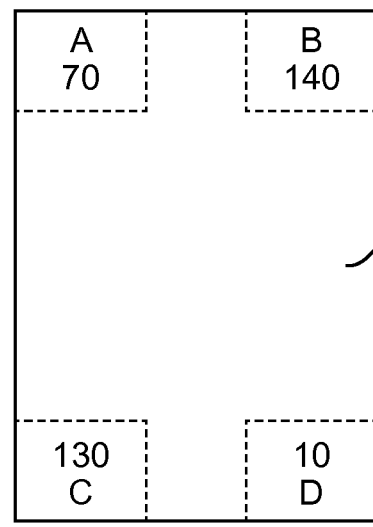
FIG. 1b

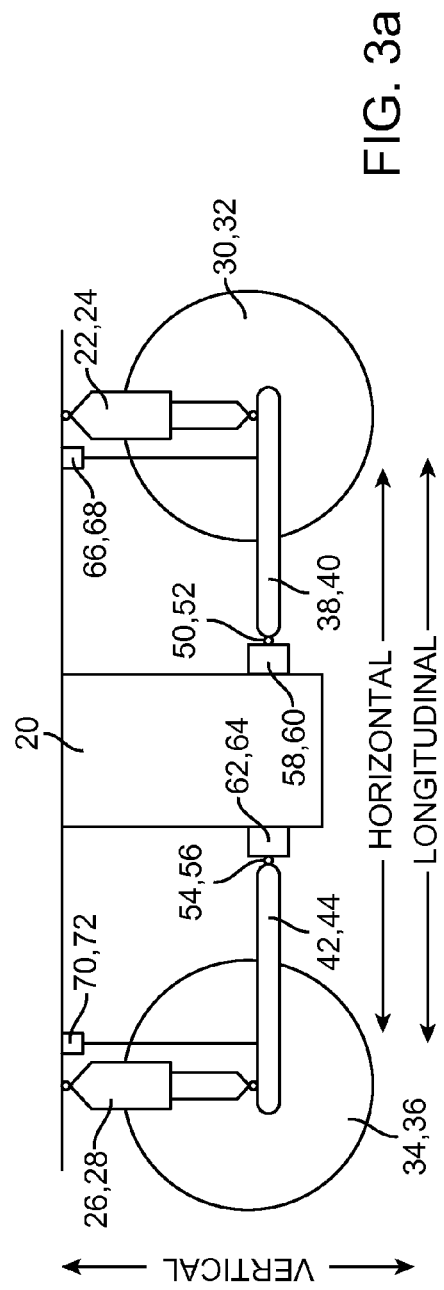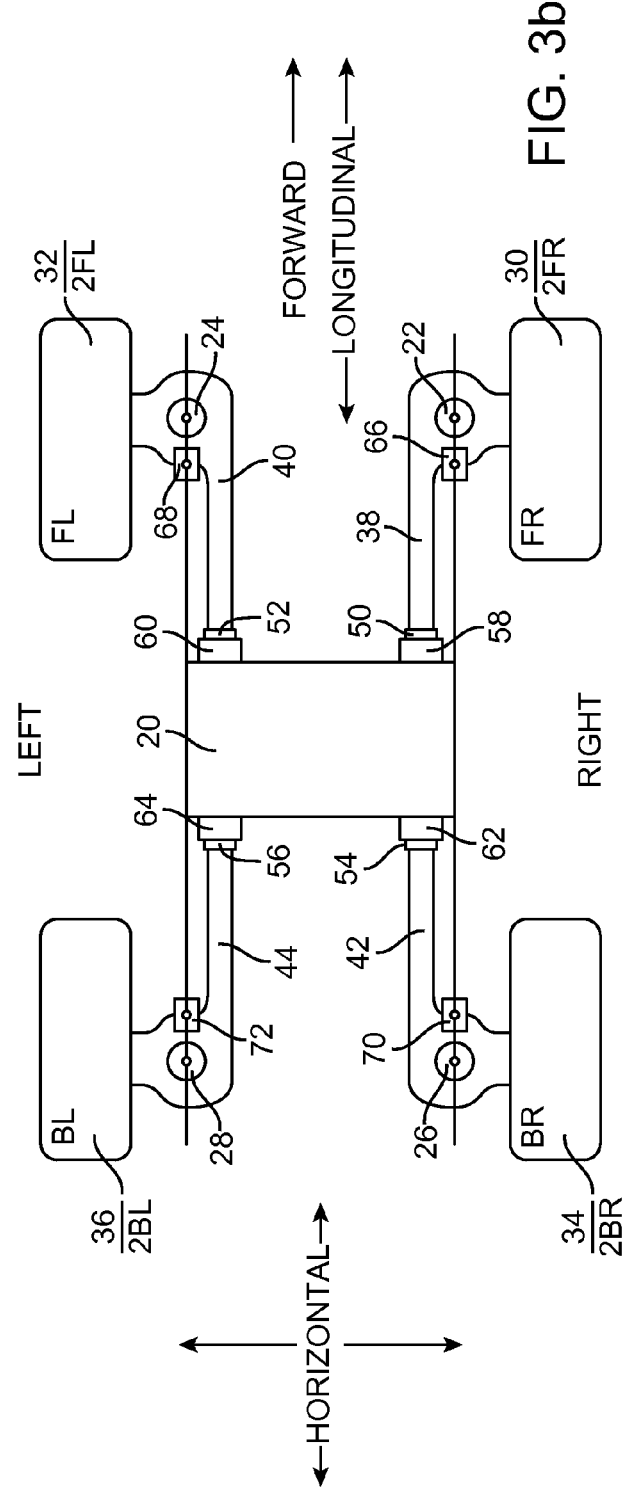

ACTIVE VEHICLE SUSPENSION SYSTEM AND METHOD FOR MANAGING DRIVE ENERGY

BACKGROUND OF THE INVENTION

1. Field of the Invention

The present invention relates generally to active vehicle suspension systems and more particularly to a system and method for enhancing an active vehicle suspension system by sensing the engagement of obstacles or uneven ground and adjusting the suspending actuator forces to reduce the amount of drive energy otherwise required to overcome the ground/pathway anomaly and move the vehicle forward while at the same time maintaining the stability of the vehicle.

2. Description of the Prior Art

In conventional vehicle suspension systems various types of springs and associated shock absorbing devices have historically been the primary components used to exert supporting forces between the chassis and wheels in order to provide vehicle stability and ride comfort. More recently, active and partially active (hybrid) suspension systems include actuators controlled by a microprocessor to provide these forces.

The benefit of active suspension systems exploited in the prior art has primarily been related to controlling the actuator forces for the purpose of improving vehicle ride comfort and control.

The present invention focuses on a separate and distinct benefit of the use of active vehicle suspension methodology to indirectly manage the power required to overcome ground/pathway anomalies; namely, the enhancement of an active suspension system for the primary purpose of shifting and adjusting the supporting actuator forces to reduce the amount of drive energy otherwise required to move a vehicle forward in uneven terrain environments including ground/pathway anomalies such as a bump, depression, boulder, ravine, ramp, etc., or any combination thereof.

Reducing the drive energy otherwise required to move a vehicle forward will provide the added benefit of enabling the vehicle to continue forward movement in hostile terrain environments where previously forward movement may have been difficult or impossible due to drive energy requirements being greater than the available drive energy or the wheel traction with the engaged terrain would allow.

In a conventional vehicle suspension system, i.e., one that uses passive springs at each wheel to exert a majority of the supporting force between the chassis and the wheels, as the vehicle travels over uneven terrain the wheels move up and down in relation to the vehicle chassis as the characteristics of the ground, roadway or other vehicle pathway change. In an extreme example, such as a rocky landscape, a large rock, or an extreme pathway anomaly or obstacle is engaged by one wheel, that wheel will move up towards the chassis (compressing the corresponding suspension element) or down away from the chassis (extending the suspension element), and the diametrically opposite wheel will move in the same direction up or down (relative to the chassis), while the two adjacent wheels will tend to move in the opposite direction down or up (extending or compressing their suspension elements).

In this example, a conventional suspension system using passive springs, the spring force pushing down on the two compressed springs will be relatively large, and the spring forces of the two extended springs will be relatively small. For ease of explanation, spring force will be referred to herein as pushing the wheel down (against the ground or other pathway surface), as opposed to pushing the chassis up. In the conventional suspension scenario of a vehicle moving over uneven terrain, any suspension element that is compressed will push downward with relatively large force and any suspension element that is extended will push downward with relatively small force; such is the operative nature of a spring.

As the vehicle travels over this type of uneven terrain, each wheel will also see varying angles of approach to bumps, rocks, ravines, crevices or other pathway anomalies encountered. For example, a wheel traveling up a rock will have a positive angle of approach (O/), a wheel traveling down a rock, or into a depression, will have a negative angle of approach (\O), and a wheel remaining on flat ground will have a zero angle (O_). At a given time, one, two or three wheels might have a positive angle of approach while the others might have zero or negative angles of approach.

Envision the right front wheel of a vehicle beginning to compress its suspension as it engages and travels over a large rock. Half way up the rock the suspension will be pushing down with a relatively large force due to its partial compression. It might also have a large positive angle of approach due to the rock being in front of it. It is easy to see that in this scenario it becomes relatively difficult for this wheel to travel forward. The greater the angle of approach (steeper the facing side of the rock) and the greater the downward force (the more compressed the spring is), the more drive energy it will take to move the wheel forward and up the face of the rock. Because the rock presents an impediment to forward movement, the total energy required to move the vehicle forward will thus be equal to the additional drive energy required to move this right front wheel forward in overcoming the impediment plus the energy required to move the other three wheels forward.

Now consider a similar situation in which the vehicle has an active suspension system wherein computer processor controlled actuators are provided at each wheel to exert selective supporting forces between the chassis and each wheel. The benefits of active suspension systems exploited in the prior art have primarily been related to improved vehicle ride comfort and control, not reduction of required drive energy or improvement in drive efficiency and functionality in situations where impediments to forward motion or other pathway anomalies are encountered.

It is therefore a principal objective of the present invention to provide an improved active vehicle suspension system and methodology in which ground/pathway anomalies are sensed, and chassis supporting actuator forces are adjusted to reduce the drive energy otherwise required to move the vehicle forward over the ground/pathway anomalies.

Another objective of the present invention is to provide an improved active vehicle suspension system and methodology in which chassis supporting actuator forces are adjusted in a coordinated and balanced manner, and applied to the wheels in a coordinated and balanced manner to reduce the drive energy otherwise required to move the vehicle forward over pathway anomalies.

Still another objective of the present invention is to provide an improved active vehicle suspension system and methodology in which chassis supporting actuator forces are adjusted in a coordinated and balanced manner following a defined set of rules that prevents unwonted chassis movement as a result of the supporting actuator force adjustments made to reduce the drive energy otherwise required to move the vehicle forward over pathway anomalies.

Yet another objective of the present invention is to provide an improved active vehicle suspension system and methodology in which the slope values of the terrain or pathway relative to the vehicle chassis in the direction of vehicle movement at the points of contact between each vehicle wheel and the ground/pathway are estimated and then used to purposefully shift chassis supporting actuator forces among the several chassis supporting actuators in order to reduce the drive energy otherwise required to move the vehicle forward over the ground/pathway anomalies.

SUMMARY OF THE INVENTION

Briefly, a presently preferred embodiment of the present invention provides a drive energy management and active suspension control system, and operative methodology, in which ground/pathway anomalies are sensed and used to enable or automatically effect adjustment of supporting actuators to reduce the resisting effects, and/or increase the assisting effects of the encountered ground/pathway anomalies, and thus reduce the vehicle drive energy that would otherwise be required to efficiently move the vehicle in the intended direction, yet maintain the stability of the vehicle.

Unlike a conventional spring suspension system in which an obstacle encountered by one wheel will cause a shift in the loads experienced by the springs associated with the other wheels but will not reduce the longitudinal motion resisting force experienced by the vehicle, in an active suspension system, the compression of the suspension components experienced by a wheel encountering an obstacle does not necessarily affect the magnitudes of the forces exerted by the several supporting actuators in supporting the vehicle, nor does it necessarily reduce the longitudinal motion resisting force experienced by the vehicle. However, in accordance with an embodiment of the present invention, when a particular wheel engages an obstacle, the resulting impediment to forward motion will be sensed and the force exerted by the actuator associated with the engaging wheel will be relaxed, resulting in a reduction of the forward motion resisting force experienced by the vehicle, and in order to maintain the stability of the vehicle, the supporting forces exerted by the other actuators will also be adjusted.

For example, in accordance with the present invention, with the right front wheel of the vehicle engaging and traveling up a rock, the computerized suspension control system will sense the condition and cause a reduction in the downward force on that wheel resulting in less drive energy needed to move that wheel forward. The computer looks at the actuators supporting the other three wheels and makes corresponding adjustments to the exerted downward forces to maintain the stability of the vehicle. These adjustments might even include purposefully increasing the downward forces exerted on wheels that have negative angles of approach for the purpose of taking advantage of the "downhill roll". This is to say that a large downward force applied to a wheel with a negative angle of approach will act to assist forward movement and reduce the overall drive energy required to move the vehicle forward.

Recognizing that an increase or decrease of downward forces will naturally exert equal and opposite forces against the vehicle chassis that might tend to cause the chassis to unwontedly accelerate upwards or downwards, force adjustments made in accordance with the present invention are applied to the wheels in a coordinated and balanced manner following a defined set of rules that prevent unwonted chassis movement.

An advantage of the present invention is that it provides an active suspension system and method which senses each wheel's positive or negative angle of approach to roadway or ground/pathway anomalies, and uses the sensed information to make appropriate actuator force adjustments and thus indirectly "manage" vehicle drive energy requirements.

Another advantage of the present invention is that it provides an active suspension system and method which determines actuator force combinations that can be used at all four wheels without upsetting the chassis and causing unwonted chassis movements that may otherwise result from the actuator force adjustments.

Still another advantage of the present invention is that it uses a computer processor to process detected information relating to encountered obstacles or other ground/pathway anomalies, and to balance and adjust the forces applied by the several suspension actuators in a manner that will reduce the amount of prime mover drive energy otherwise required to move the vehicle forward while maintaining vehicle stability and ride control.

These and other advantages of the present invention will become apparent to those skilled in the relevant art upon reading the following detailed disclosure of the embodiments illustrated in the several figures of the Drawing.

BRIEF DESCRIPTION OF THE SEVERAL VIEWS OF THE DRAWING

FIGS. 1a and 1b are two-part schematic diagrams depicting an important concept relating to the present invention, and illustrating how a rectangular platform can be suspended by forces at each corner, and how those forces can be altered or adjusted ("shifted") without having an impact on the orientation or stability of the platform in space;

FIGS. 3a and 3b are respectively, schematic profile (elevation) and plan views showing primary structural components of a vehicle, and exemplary positioning/connection points between actuators and sensing components where that relationship is important to the operation of an embodiment of the present invention;

DETAILED DESCRIPTION OF THE EMBODIMENTS

Figure 2A:
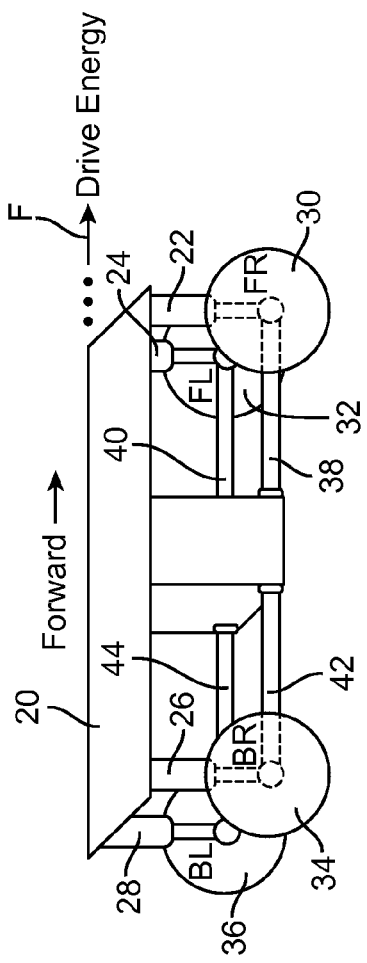
FIGS. 2a and 2b are two-part schematic diagrams respectively illustrating the forces required to be exerted on a uniformly suspended platform to move the platform forward on flat ground in one case, and over an obstacle or impediment in another case without benefit of the present invention.

By way of introduction, the present invention may be generally characterized as an active drive energy management and suspension system for a vehicle having a vehicle chassis supported above at least four ground/pathway engaging vehicle wheels, the system comprising inter alia: a plurality of actuators, each capable of exerting a variable supporting force between an associated vehicle wheel and the vehicle chassis; means for determining the slope of the ground/pathway relative to the vehicle chassis in the direction of vehicle movement at the points of contact between each vehicle wheel and the ground/pathway, and for generating corresponding slope signals; and control means responsive to the inter relationships of the respective slope signals and operative to determine therefrom an engagement of a ground/pathway anomaly acting as an impediment or assistant to forward motion of the vehicle, and to cause a first set of the actuators associated with a first set of diametrically opposite wheels to decrease the supporting forces exerted thereby, and to simultaneously cause the supporting forces exerted by a second set of actuators associated with a second set of diametrically opposite wheels to be increased, thereby reducing the prime mover energy otherwise required to drive the vehicle in the intended direction of vehicle movement over the ground/pathway anomaly.

The control means monitors the inter relationships of the respective slope signals, and based upon such relationships selects, as a first set of diametrically opposite actuator forces to be modified, those forces generated by the actuators supporting the wheels disposed at the diametrically opposite sides of the chassis and appearing to be encountering ground/pathway slopes having "slope values" (represented by detected or calculated slope signals) with the highest summed value as compared to the summed value of the second set of detected slope values, i.e., those corresponding to the other set of diametrically disposed wheels.

The control means determines the respective ground/pathway slopes by measuring generally longitudinal motion resistive force components in the direction of vehicle movement of each vehicle wheel, and by measuring corresponding generally vertical chassis supporting force components at each vehicle wheel. It then determines the slope of the ground/pathway relative to the vehicle chassis in the direction of vehicle movement at the point of contact between each vehicle wheel and the ground/pathway by dividing each associated wheel longitudinal force component by the corresponding vertical force component Once the control means has determined the set of wheels encountering ground/pathway slopes having the highest summed slope value, it causes the supporting forces generated by the corresponding actuators to be reduced by equal amounts, and simultaneously causes the supporting forces generated by the other set of actuators to be increased by the same amounts.

Alternatively, the control means may include means for determining the speed of the vehicle and for generating a corresponding rate of forward movement signal; means for determining the rate of change of the distance between each vehicle wheel and the vehicle chassis, and for generating corresponding ride height rate of change signals; and means for estimating the slope of the ground/pathway relative to the vehicle chassis in the direction of vehicle movement at the point of contact between each vehicle wheel and the ground by dividing each associated wheel ride height rate of change signal by the vehicle rate of forward movement signal.

Similarly, the control means may include a LIDAR or 3D camera (not shown) system for determining the slopes of the ground/pathway relative to the vehicle chassis in the direction of vehicle movement at the points of contact between each vehicle wheel and the ground.

Referring now to FIGS. 1a and 1b of the Drawing, simplified plan view diagrams are shown each illustrating two vehicle load scenarios used to provide visualization of an important concept that allows the present invention to work; namely, that a rigid rectangular platform, such as a vehicle chassis, can be vertically suspended by differing upward forces applied at each corner, such as is provided by the actuators (not shown) of an active suspension system. It is well understood by those skilled in the vehicle art that while a chassis may be statically suspended by different forces at each corner, the act of increasing or decreasing the forces applied at one or more corners of the platform may tend to accelerate the platform upwards or downwards. A key concept of the present invention is the recognition that the forces applied at opposite corners of the platform can be decreased while correspondingly increasing the forces at the other two corners to keep the platform balanced and free from acceleration upwardly or downwardly.

Specifically, FIGS. 1a and 1b are arbitrary plan views of two different rectangular vehicle platforms 10 and 12 representative of a rigid vehicle chassis with the corners of each being labeled A, B, C, and D. The numbers shown in each corner represent exemplary values of the upward pounds of force applied to that corner of the rectangular platform, to statically support the platform. Note that in scenario 1 of FIG. 1a the supporting forces are equal at each corner, but in scenario 1 of FIG. 1b the supporting forces are not equal at each corner. Note also that in scenario 1 and scenario 2 of the respective FIGS. 1a and 1b, different forces are shown applied to the corners of each platform.

It is of note that although the forces shown in each scenario 2 differ from those shown in the corresponding scenario 1, in both scenarios the forces will act in unison to support the respective platforms without accelerating a corner upward or downward, and will thus result in the platform staying suspended in a stable manner. This can be accomplished by reducing the force on one corner of a supported platform (without causing that corner or any other to accelerate unwontedly), subtracting the same amount of force from the diametrically opposite corner, and adding the subtracted amount of force to both adjacent corners.

For example, in the 4000 pound chassis 10' of FIG. 1a, scenario 2, one thousand pounds of force was removed from corner A resulting in zero pounds of force being applied at that corner; one thousand pounds of force was also subtracted from corner D resulting in zero pounds of force applied at that corner; and one thousand pounds of force was added to each of corners B and C resulting in two thousand pounds of force operating at corners B and C. This method of "shifting" forces between corners in scenario 1 and scenario 2 will have a tendency to keep the each corner of the suspended platform 10, and the platform in its entirety, stable and not accelerated upwardly or downwardly. Such is the nature of a supported rigid rectangular platform.

In FIG. 1b, scenario 2, the same logic was applied to an unevenly loaded 350 pound platform 12 of scenario 1, except this time, "shifting" 50 pounds of force with the same result of not accelerating the platform and maintaining it stable.

The present invention leverages this ability to "shift" forces between the corners of a supported platform. The above concept explains how the forces can be shifted while having no effect on the platform positioning and stability. FIGS. 2a-2d thus illustrate the benefits that shifting forces between corners can provide.

In the following description, the term "neutral buoyancy" will refer to the state of a platform being suspended in a stable condition. When a platform is "neutrally buoyant" it will mean that an appropriate combination of forces is being applied to the four corners to make the platform "float" in a stable condition even though the weight of the platform might not be evenly distributed among the four corners. When a platform is floating (is neutrally buoyant), increasing the total of the several forces above this neutral buoyancy, or decreasing the total of the several forces below the neutral buoyancy, will naturally cause the platform to accelerate upwards or downwards.

It is also to be noted that, regardless of whether a platform is being supported by neutral buoyancy forces, or accelerated by forces above or below the neutral buoyancy state, shifting the forces in a manner as described above will have negligible effect on the positioning and acceleration of the platform.

Referring now to FIG. 2a, a vehicle chassis 20 is shown in simplified form and is supported by four actuators 22-28 attached to four wheel assemblies 30-36. The supporting suspension also includes four horizontally disposed control arms 38-44 pivotally coupling each wheel assembly to chassis 20, and may further include laterally constraining links or radius rods (not shown). If the sprung weight of the chassis (platform) 20 is an evenly distributed 4000 pounds, then, as indicated by the chart at the right side of FIG. 2a, vertical forces of 1000 pounds applied by each of the actuators 22-28 will support the chassis above the wheel assemblies 30-36. On flat ground the vehicle will roll forward with relatively little force F applied to the chassis 20 in the forward direction.

For the purpose of this demonstration we will consider the friction between the wheel and the ground, and any other non-ideal minor force contributing items as negligible and therefore zero in regards to opposing forward wheel assembly motion and thereby vehicle movement. The force required to overcome inertia and move the vehicle in the forward direction is illustrated as F.

The chart on the right side of FIG. 2a also shows a column labeled "Longitudinal Wheel Force". These are the longitudinal forces that the chassis must exert on the wheel assembly though the associated control arm to begin to move the wheel assembly in the forward direction. It is understood that to move the chassis 20 and vehicle forward, the drive energy of the vehicle must equal or exceed the force F, plus the total of the four wheel assembly longitudinal forces shown in the "Total" row of the "Longitudinal Wheel Force" column.

Figure 2B:
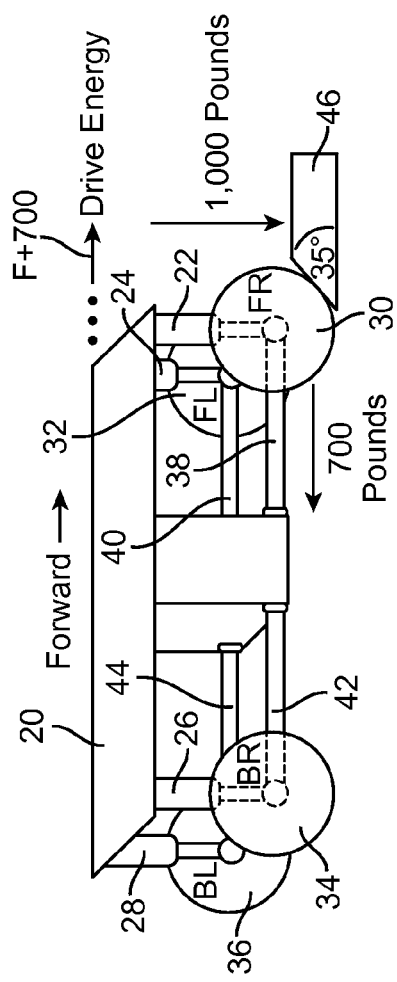

If, as suggested in FIG. 2b, an obstacle/pathway anomaly such as a 35 degree ramp 46 is placed in front of the Front Right (FR) wheel 30, it will be understood by those skilled in the art that in ascending the ramp with a vertical force of 1,000 pounds pushing the wheel assembly downward, a longitudinal force of at least 700 pounds must be applied to the FR wheel assembly to move the wheel assembly forward and up the ramp. (tan 35°=0.700; i.e., 1,000 pounds downward force from the actuator 22 times 0.700=700 pounds resisting force) It will also be understood that in engaging and surmounting the ramp 46, the longitudinal force exerted by the control arm to the wheel assembly will be longitudinally transmitted to the chassis through the control arm 38. In this case, because the ramp angle is 35°, the longitudinal resisting force will be equal to 700 pounds. Thus, in addition to the initial vehicle drive force F it will take an additional 700 pounds of drive force, i.e. a total force of F plus 700 pounds applied to the chassis 20 in the forward direction to begin movement of the vehicle forward and the right front wheel assembly up the ramp 46.

Figure 2C:
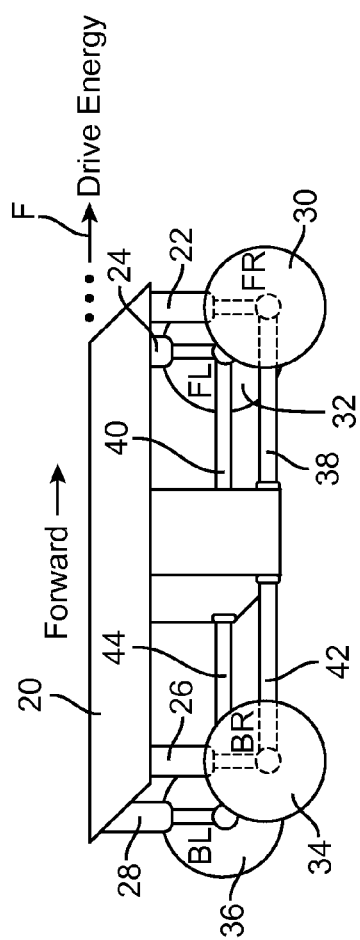
FIGS. 2c and 2d are schematic diagrams respectively illustrating the forces required to be exerted on a non-uniformly suspended platform to move the platform forward on flat ground in one case, and up/over an obstacle or ground/pathway anomaly in a second case with benefit of the present invention.

Alternatively, as indicated by the chart at the right side of FIG. 2c, the forces applied by the actuators 22-28 can be adjusted in a manner to continue supporting the chassis 20 in a stable manner. For example, the front right (FR) actuator 22 force can be reduced to 100 pounds if the back left (BL) actuator 28 force is also reduced to 100 pounds, and the actuator forces applied by the front left (FL) actuator 24 and back right (BR) actuator 26 are increased to 1900 pounds each. Note that in so doing, the shifting of forces among the four actuators will continue to support the 4000 pound platform in a stable manner. As in the case illustrated in FIG. 2a, on flat ground the vehicle can still be rolled forward with relatively little force F applied to the chassis in the forward direction.

Figure 2D:
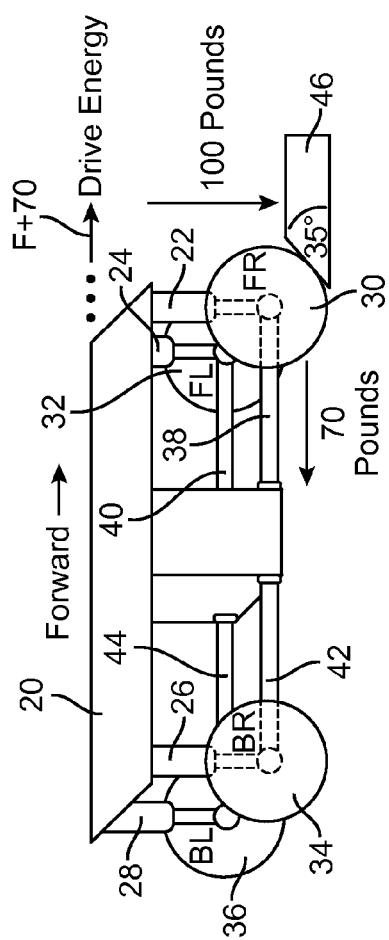

With the above example in mind, it will naturally follow that if the actuator forces are shifted as shown in FIG. 2c and are applied to the chassis shown in FIG. 2d, and the 35° ramp 46 of FIG. 2d is placed in front of the FR wheel 30, a longitudinal force of only 70 pounds is required to be exerted on the FR wheel assembly to move the wheel assembly forward and up the 35 degree angle ramp. (tan 35°=0.700; i.e., 100 pounds downward force on from the actuator 22 times 0.700=70 pounds resisting force) and concurrently, the longitudinal resisting force applied to the chassis by the ramp will likewise only be 70 pounds.

Thus it will only take an additional 70 pounds force (in addition to the initial drive force F) applied to the chassis 20 in the forward direction to begin movement of the vehicle forward. Even though the total vehicle weight remains at 4000 pounds, the reduced forward force required in the load shifted scenario of FIG. 2d to move the chassis 20 and vehicle forward and wheel assembly up the ramp 46 represents a significant advantage over the scenario represented in FIG. 2b. This reduced forward force obviously equates to a requirement of less drive energy needed to move the vehicle forward in the face of an obstacle. Such advantage can be repeated in similar degree in numerous scenarios with the ramp replaced by an obstacle such as a large rock or bump encountered by any wheel or combination of wheels. Similarly, the positive slope ramp can be replaced with a negative slope ramp and by increasing the actuator force on the wheel that is engaging the ramp the longitudinal force induced will assist forward vehicle movement and similarly result in less total drive energy required to move the vehicle forward. The embodiment of the present invention described herein below will provide this advantage.

Figure 4:
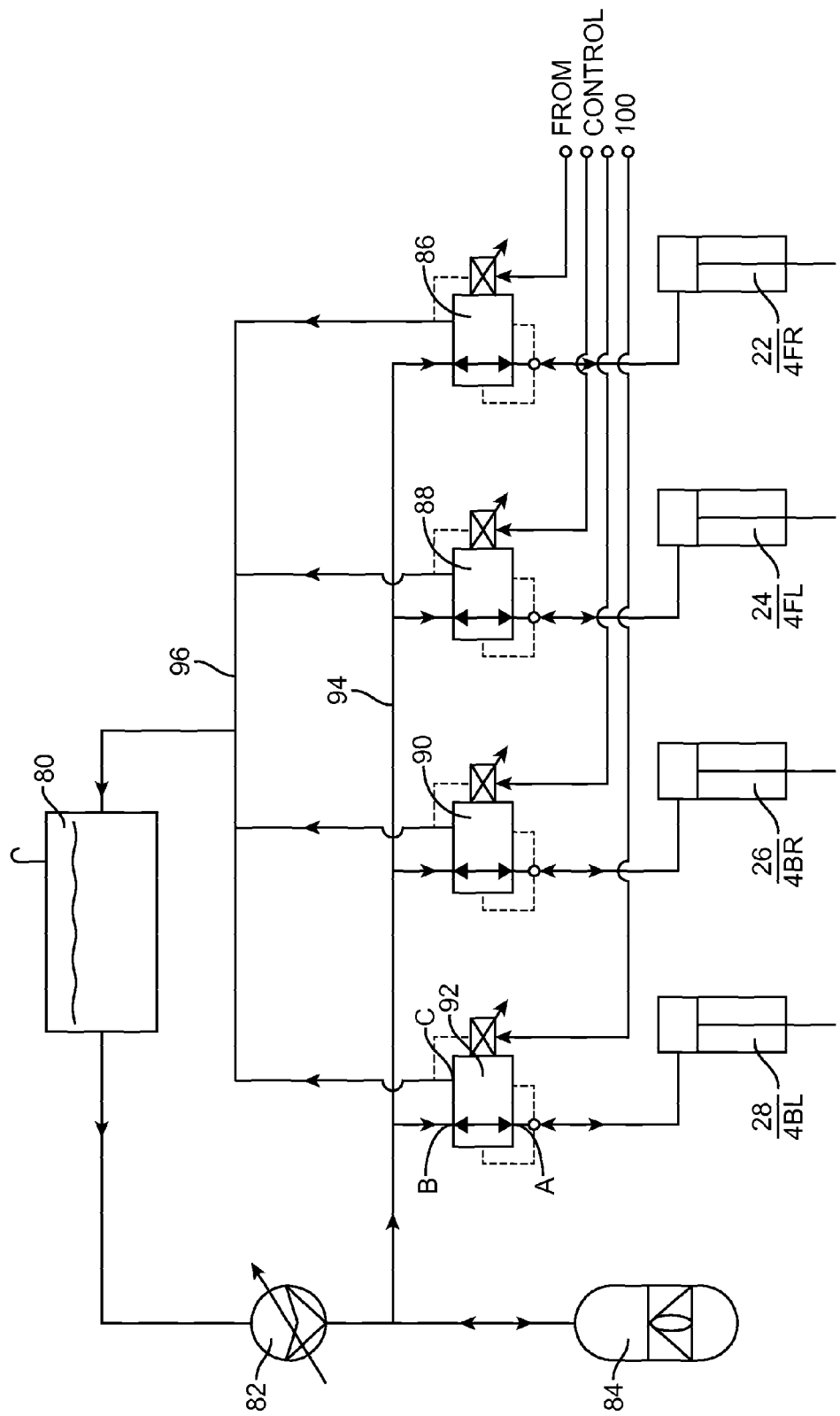
FIG. 4 is a schematic diagram showing the primary fluid circuit and hydraulic system components used to generate actuator energizing or relaxing hydraulic fluid pressure in accordance with an embodiment of the present invention.
Figure 5:
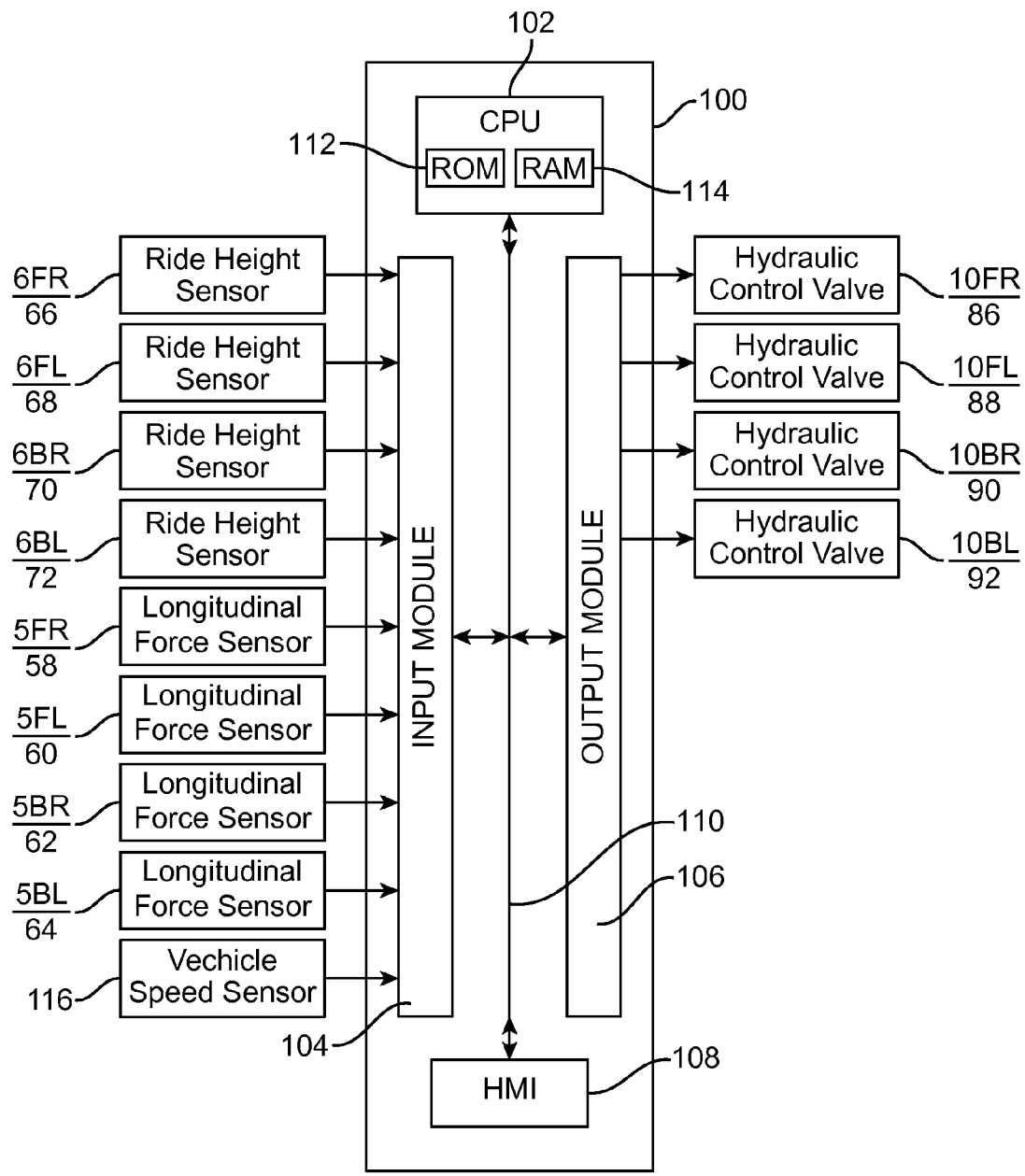
FIG. 5 is a block diagram schematically illustrating electric control system, longitudinal force sensors, ride height sensors, and hydraulic control valves, and their interconnections in accordance with an embodiment of the present invention.

Turning now to FIGS. 3a and 3b, which are respectively profile (elevation) and plan views of a basic 4-wheel vehicle including a chassis 20, a plurality of variable actuators 22-28 suspending the chassis 20 above a plurality of wheel assemblies 30-36, a plurality of control arms 38-44 connecting the wheel assemblies to the chassis 20 via a plurality of ball joints or other hinging units 50-56, each including an associated longitudinal force sensor 58-64, and a plurality of ride height sensors 66-72. The chassis 20 is the primary structural component of the vehicle and may carry typical vehicle body components including inter alia, occupant seating, a motor and associated parts, control system devices, instrumentation and payload (not shown in this figure; but some of which are schematically illustrated in FIGS. 4 and 5).

The actuators 22-28 provide vertical forces to support the sprung weight and suspend the chassis 20, etc., above the wheel assemblies 30-36. In this embodiment one end of each actuator 22-28 is attached to a wheel assembly 30-36 and the other end of the actuator is attached to the chassis 20. Both attachments preferably include spherical joints that allow angular rotation. Each actuator is a hydraulic cylinder in which hydraulic fluid pressure is applied to generate supporting vertical force between a wheel assembly and the chassis 20. In other embodiments the actuators may include electric, magnetic, pneumatic actuators or other forms of actuators.

In this embodiment the actuators 22-28 are the only components used to generate vertical force between a wheel assembly and the chassis 20, thus making the system fully active. In other embodiments, in addition to the actuators, there might be springs, torsion bars, shocks, or sway bars (not shown) that provide additional vertical force, making the system partially active.

The wheel assemblies 30-36 are each comprised of a tire, a wheel, a hub, and certain axle components, and may be driven or non-driven. In this embodiment, the wheel assemblies 30-36 are independent of each other, although in other embodiments, two wheel assemblies may be connected by axle components (not shown) in an embodiment commonly referred to as a solid-axle configuration.

The four wheel assemblies 30-36 are also respectively identified as the FR (Front Right) wheel assembly 30, the FL (Front Left) wheel assembly 32, the BR (Back Right) wheel assembly 34, and the BL (Back Left) wheel assembly 36. Where "FR", "FL", "BR", or "BL" appear as a suffix in the following content, it will indicate the particular wheel assembly that a particular component is associated with. In other embodiments there can be more than four wheel assemblies. The control arms 38-44 determine, at least in part, the path of movement of the associated wheel assemblies relative to the chassis 20. In the illustrated embodiment, the relevant path of movement of each wheel assembly relative to the chassis is designed to be primarily in the vertical direction (drive linkages and wheel turning components being omitted for clarity).

In this embodiment there is one control arm per wheel assembly. In other embodiments there can be multiple control arms per wheel assembly. Examples of common suspension systems that use multiple control arms per wheel assembly include the double wishbone, three-link and four-link configurations, etc. In this embodiment one end of each control arm 38-44 is solidly attached to a corresponding wheel assembly 30-36; the other end of each control arm 38-44 is attached to the chassis 20 by a hinge, or ball and socket joint 50-56 in a manner that only allows vertical movement of the attached wheel assembly with negligible lateral and longitudinal movement. Each joint 50-56 preferably includes an integrally associated longitudinal force sensor 58-64.

In other embodiments, components other than what are commonly referred to as control arms may be used to determine the path of movement of the associated wheel assemblies relative to the chassis 20. An example might include leaf spring style suspension systems.

Each longitudinal force sensor 58-64 is used to measure the longitudinal force in the direction of intended vehicle movement that a wheel assembly 30-36 exerts on the chassis 20.

In this embodiment one longitudinal force sensor is provided per wheel assembly. In other embodiments there can be more than one longitudinal force sensor per wheel assembly, especially where there is more than one control arm per wheel assembly.

In this embodiment each longitudinal force sensor is a load cell with its base solidly mounted to the chassis 20. In this embodiment the longitudinal force sensors 58-64 directly measure the longitudinal forces in the direction of intended vehicle movement that a corresponding wheel assembly exerts on the chassis 20. This is due to the fact that the load cell is mounted in the same angular direction as the intended vehicle movement. In other embodiments, where there are more than one longitudinal force sensor per wheel assembly, and/or the longitudinal force sensor is not mounted in the same angular direction as the intended vehicle movement, the longitudinal force in the direction of intended vehicle movement can be calculated, or approximated, through vectoring and summing of the forces exerted by the wheel assembly on the chassis.

In this embodiment each longitudinal force sensor preferably generates a 4-20 milliamp electrical signal proportional to the force measured. In this embodiment there is preferably also one Ride Height Sensor per wheel assembly. Each Ride Height Sensor is used to measure the vertical distance between a wheel assembly 30-36 and the chassis 20.

In this embodiment the ride height sensor is preferably a linear distance sensor with one end affixed to the chassis 20 and the other end attached to an associated wheel assembly. In other embodiments the ride height sensors can be embodied as sonar type sensors, angle sensors, actuator position sensors, or other devices used for the purpose of measuring distance. In this embodiment each ride height sensor preferably generates a 4-20 milliamp electrical signal proportional to the linear distance measured.

In FIG. 4, a schematic fluid circuit diagram is provided showing the primary hydraulic system flow paths and components used to generate and deliver hydraulic fluid pressure to the actuators in an embodiment of the present invention. The system includes a hydraulic tank 80, a hydraulic pump 82, a hydraulic accumulator 84, four hydraulic control valves 86-92, and a network of high pressure fluid supply lines 94 and low pressure return lines 96 interconnecting the various components to the four actuators 22-28. The hydraulic tank 80 serves as a fluid reservoir. In this embodiment the hydraulic tank 80 is vented to the atmosphere and operates at atmospheric pressure.

The hydraulic pump 82 withdraws hydraulic fluid from the tank 80 and pumps the fluid to a predetermined relatively high discharge pressure. In this embodiment, the hydraulic pump is preferably a variable displacement piston pump with pressure compensation control set at a constant 3,000 psi.

The hydraulic accumulator 84 provides a surge volume for the high pressure hydraulic fluid provided by pump 82. The primary function of the accumulator is to store high pressure hydraulic fluid and make it available when the pump alone is unable to provide the required flow necessary to meet system demand. In this embodiment, the accumulator 84 is preferably a nitrogen bladder style hydraulic accumulator.

The hydraulic control valves 86-92 are used to convert input electrical control signals into hydraulic fluid pressure acting on the various hydraulic actuators 22-28. In this embodiment the hydraulic control valves 86-92 are proportional pressure regulating and relieving valve devices.

The magnitudes of the electrical signals (pulse width modulated signals) input to the respective control valves are proportional to the pressures that the valves will maintain at their Ports A. If the fluid pressures at any Port A should be less than the pressure set by a corresponding input electrical signal, then that control valve will allow high pressure fluid to flow from its Port B to its Port A to drive an associated actuator. 22-28 If the pressure at any Port A is greater than the pressure set by a corresponding input electrical signal, then that control valve will relieve fluid from Port A and allow fluid in the corresponding actuator to exit through Port C and flow back to the tank 80.

In this embodiment, the hydraulic control valves 86-92 will thus cause a corresponding actuator 22-28 to generate a vertical force between the chassis 20 and a corresponding wheel assembly 30-36 which is proportional to the magnitude of an electrical signal communicated to the corresponding control valve 86-92. In this embodiment there is one hydraulic control valve per actuator.

Referring to FIG. 5 of the drawing, a block diagram of an electronic control device in the form of a programmable logic controller (PLC) is shown at 100 and comprised of a CPU 102, an input module 104, an output module 106, and a human machine interface (HMI) 108, all of which are linked with each other by a two-way communication bus 110.

The input module 104 is supplied with signals indicative of the ride height Rx (where "x" is "1" for the front right wheel, "2" for the front left wheel, "3" for the back right wheel, and "4" for the back left wheel) from the ride height sensors 6FR, 6FL, 6BR, and 6BL, respectively. Each ride height Rx is a variable signal between 0% to 100% representing the vertical position of the associated wheel assembly in relation to the chassis 20. A ride height Rx of 0% is representative of the associated wheel assembly 2FR, 2FL, 2BR, 2BL positioned as close as possible to the chassis 20 (fully compressed). A ride height Rx of 100% is representative of a wheel assembly 2FR, 2FL, 2BR, 2BL separated as far as possible from the chassis 20 (fully extended).

The input module 104 is also supplied with signals indicative of the longitudinal force Lx (where "x" is "1" for the front right wheel, "2" for the front left wheel, "3" for the back right wheel, and "4" for the back left wheel) from the longitudinal force sensors 5FR, 5FL, 5BR, and 5BL, respectively. Each longitudinal force Lx is a variable signal representing the pounds of force that the associated wheel assembly 2FR, 2FL, 2BR, 2BL is exerting on the chassis 20 in the direction of intended vehicle movement. Positive pounds force is representative of opposition to movement in the direction of intended vehicle movement. Negative pounds force is representative of force acting in the same direction as intended vehicle movement (and therefore assisting forward movement).

The input module 104 is also supplied with a signal indicative of the vehicle speed VS from a Vehicle Speed Sensor 116. The vehicle speed signal VS is representative of the vehicle rate of forward travel in meters per second.

The input module 104 processes the signals input and, at the request of the CPU 102, provides those processed signals to the CPU 102.

The HMI 108 is preferably a touch screen display located in the cabin of the vehicle that allows the driver or a passenger (operator) to interface with the CPU 102. The operator is able to view data and supply data to the CPU 102. The operator can adjust the vehicle ride height setpoints Rsp1, Rsp2, Rsp3 and Rsp4 for the respective wheels. The ride height setpoints Rsp1, Rsp2, Rsp3 and Rsp4 can be adjusted between a value of 0% and 100% by the operator using the HMI 108. The ride height setpoints Rsp1, Rsp2, Rsp3 and Rsp4 are adjusted by the operator based on personal preference as to how high or how low he prefers the chassis 20 to be positioned above the wheels 30-36.

The CPU 102 accepts inputs from the input module 104 and HMI 108. The CPU 102 performs the control logic shown in FIG. 6 and outputs to the output module 106. The CPU 102 contains ROM (Read Only Memory) 112 and RAM (Random Access Memory) 114. The ROM 112 stores the control logic. The RAM 114 holds the software calculated points and software flag values that are used by the control logic.

The output module 106, receives an actuator force signal Ax (where "x" is "1" for the front right wheel, "2" for the front left wheel, "3" for the back right wheel, and "4" for the back left wheel) from the CPU 102, and outputs pulse width modulation signals to the hydraulic control valves 86-92 (10FR, 10FL, 10BR, and 10BL), respectively. The actuator force signal Ax represents a desired pounds force at the associated hydraulic actuator 22-28 (4FR, 4FL, 4BR, and 4BL). The output module 106 directly converts the actuator force signal Ax to a pulse width modulation signal that drives the hydraulic control valves 86-92 (10FR, 10FL, 10BR, and 10BL) to produce the desired pounds force at the associated actuator 22-28 (4FR, 4FL, 4BR, and 4BL).

Figure 6:
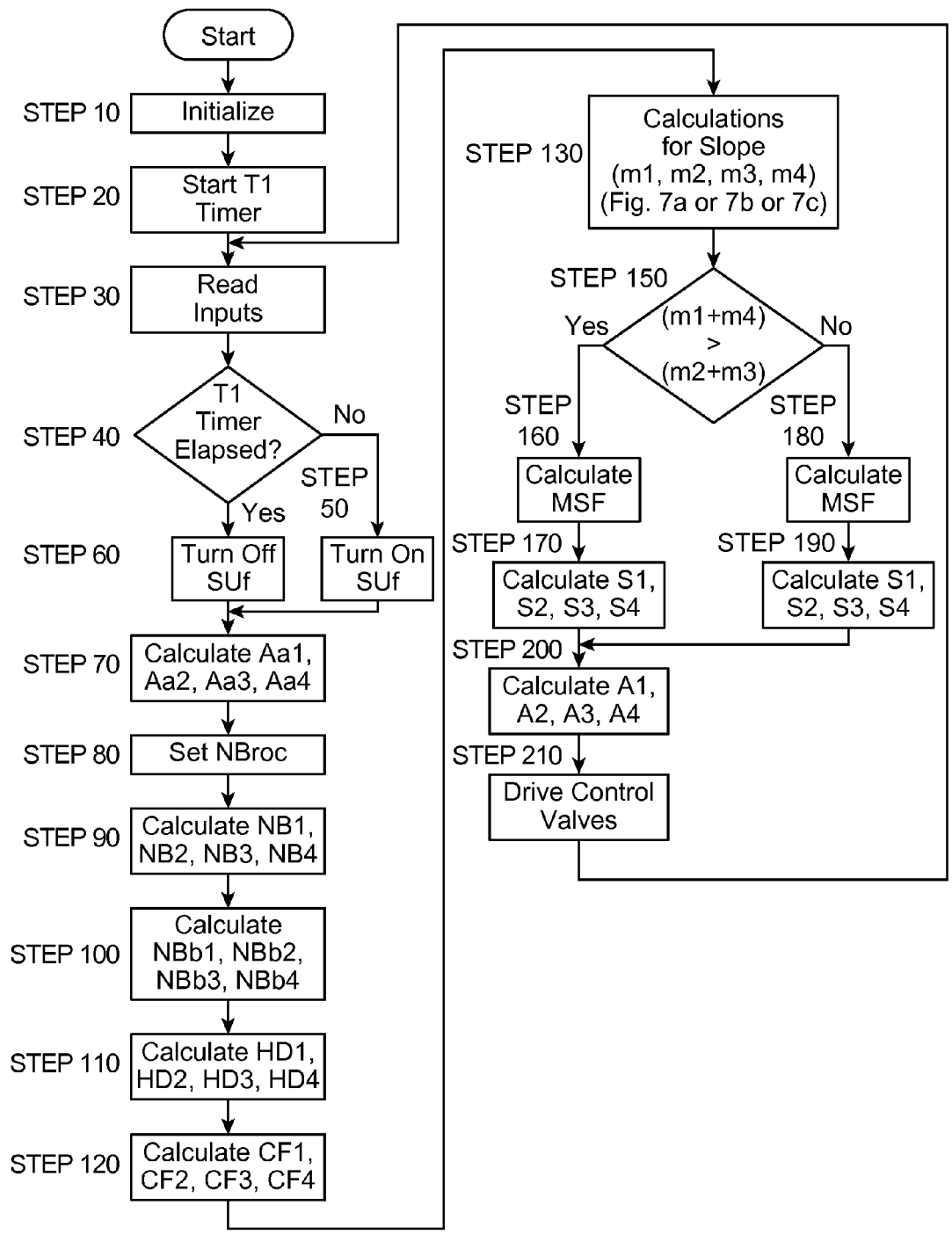
FIG. 6 is a flow chart schematically depicting an embodiment of the control logic of the cyclical computer program carried out by the electric control device of FIG. 5.

A control logic flow chart in accordance with an embodiment of the present invention is depicted in FIG. 6 and is executed by the CPU 102 in a cyclic manner. The flow chart is set to execute at a consistent time interval of one cycle per 2 milliseconds. One cycle is defined as one execution of the step 30.

In Step 10 the RAM 114 is cleared of all information with all software calculated points set to zero and all software flags set to off. Flow of control passes next to Step 20.

In Step 20 the startup timer T1 is started and set to elapse after Twenty seconds. Flow of control passes next to Step 30.

In Step 30 all inputs from the Input Module 104 and HMI 108 are read into the CPU 102. Flow of control passes next to Step 40.

In Step 40 a decision is made as whether or not the startup timer T1 has elapsed. If a decision is made that the startup timer T1 has elapsed, then flow of control passes next to step 60. If a decision is made that the startup timer has not elapsed then flow of control passes next to step 50.

In Step 50 the startup flag SUf is turned on. Flow of control passes next to Step 70.

In Step 60 the startup flag SUf is turned off. Flow of control passes next to Step 70.

Step 70 calculates the average actuator force Aa1, Aa2, Aa3 and Aa4 for each of the wheels 30-36. The average actuator forces Aa1, Aa2, Aa3 and Aa4 are set equal to a 1,000 sample mean average of the associated actuator forces A1, A2, A3 and A4 respectively corresponding to each wheel 30-36. (1,000 samples at 2 ms each equates to a two second average). Flow of control passes next to step 80.

In Step 80 the maximum neutral buoyancy rate of change NBroc is set to one of two predetermined values based on the startup flag SUf. If the startup flag SUf is on then the maximum neutral buoyancy rate of change NBroc is set to a relatively high predetermined value providing an increased rate of change during startup. If the startup flag SUf is off then the maximum neutral buoyancy rate of change NBroc is set to a predetermined normal rate of change. Flow of control passes next to step 90.

Step 90 calculates the neutral buoyancy forces NB1, NB2, NB3 and NB4 for the respective wheels 30-36. As described previously, the neutral buoyancy of a platform (chassis) is the amount of force at each corner (wheel) that would be needed to suspend the platform (chassis) without accelerating the platform unwontedly. It is expected that the neutral buoyancy forces calculated here will be inaccurate upon initial system startup, and as such, the elevated maximum neutral buoyancy rate of change described in step 80 will allow the logic in step 90 to reach a more accurate neutral buoyancy quickly. Upon initial system startup it is expected that the neutral buoyancy forces NB1, NB2, NB3 and NB4 for the respective wheels 30-36 will begin at zero and quickly increase in magnitude until they reach the forces required to obtain a neutrally buoyant platform (chassis). The control logic to calculate the neutral buoyancy forces NB1, NB2, NB3 and NB4 for the respective wheels is carried out every two seconds (1,000 program cycles) according to the following equations and functions, and thereafter the flow of control passes next to step 100.

If Aa1 is greater than NB1 then NB1 is increased up to Aa1, but by a value no greater than NBroc.

If Aa1 is less than NB1 then NB1 is decreased down to Aa1, but by a value no greater than NBroc.

If Aa2 is greater than NB2 then NB2 is increased up to Aa2, but by a value no greater than NBroc.

If Aa2 is less than NB2 then NB2 is decreased down to Aa2, but by a value no greater than NBroc.

If Aa3 is greater than NB3 then NB3 is increased up to Aa3, but by a value no greater than NBroc.

If Aa3 is less than NB3 then NB3 is decreased down to Aa3, but by a value no greater than NBroc.

If Aa4 is greater than NB4 then NB4 is increased up to Aa4, but by a value no greater than NBroc.

If Aa4 is less than NB4 then NB4 is decreased down to Aa4, but by a value no greater than NBroc.

Step 100 calculates the balanced neutral buoyancy forces NBb1, NBb2, NBb3 and NBb4 for the respective wheels 30-36. The balanced neutral buoyancy of a platform (chassis) is the most uniform and balanced combination of forces at each corner (wheel) that will place the platform (chassis) in a neutrally buoyant condition. The control logic to calculate the balanced neutral buoyancy forces NBb1, NBb2, NBb3 and NBb4 for the respective wheels is carried out according to the following equations, and thereafter, the flow of control passes next to step 110.

$$NBb1=((NB1+NB2)(NB1+NB3))/(NB1+NB2+NB3+NB4)$$

$$NBb2=((NB2+NB1)(NB2+NB4))/(NB1+NB2+NB3+NB4)$$

$$NBb3=((NB3+NB4)(NB3+NB1))/(NB1+NB2+NB3+NB4)$$

$$NBb4=((NB4+NB3)(NB4+NB2))/(NB1+NB2+NB3+NB4)$$

Step 110 calculates the ride height deviation forces HD1, HD2, HD3 and HD4 for the respective wheels 30-36. The ride height deviation forces HD1, HD2, HD3 and HD4 are directly proportional to the errors between the ride height setpoints Rsp1, Rsp2, Rsp3, Rsp4 and the associated ride heights R1, R2, R3, R4. In the equation below, Khd represents a predetermined constant or gain. The control logic to calculate the ride height deviation forces HD1, HD2, HD3 and HD4 for the respective wheels 30-36 is carried out according to the following equations, and thereafter, the flow of control passes next to step 120.

$$HD1=(Rsp1-R1)Khd$$

$$HD2=(Rsp2-R2)Khd$$

$$HD3=(Rsp3-R3)Khd$$

$$HD4=(Rsp4-R4)Khd$$

Step 120 calculates the combined forces CF1, CF2, CF3 and CF4 for the respective wheels 30-36. The control logic to calculate the combined forces CF1, CF2, CF3 and CF4 is carried out according to the following equations, and thereafter the flow of control passes next to step 130.

$$CF1=NBb1+HD1$$

$$CF2=NBb2+HD2$$

$$CF3=NBb3+HD3$$

$$CF4=NBb4+HD4$$

Figure 7A:
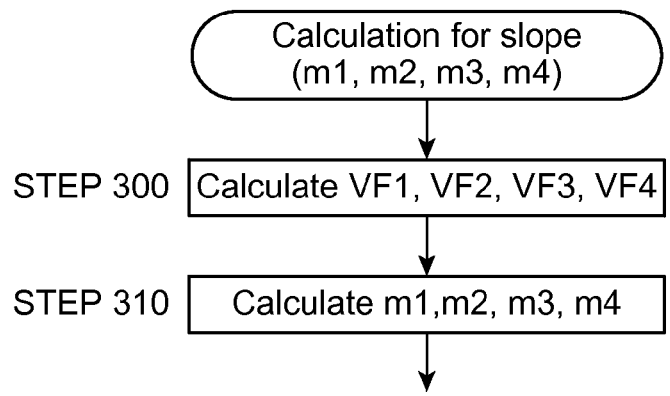
FIGS. 7a, 7b and 7c are flow charts each schematically depicting a different method of accomplishing a single control logic function of FIG. 6.
Figure 7B:
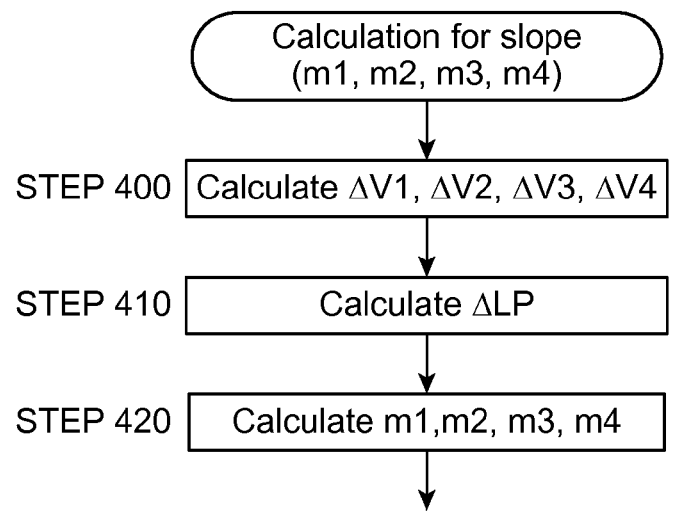
Figure 7C:
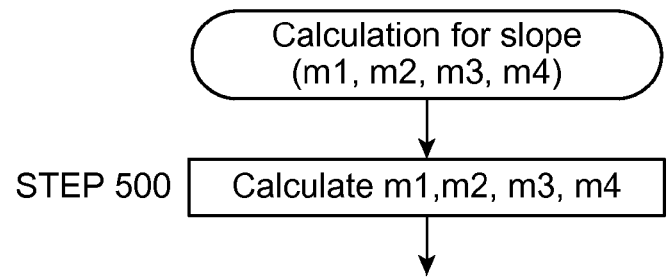

In Step 130, as will be described in detail referring to FIGS. 7a through 7c, slope values m1, m2, m3 and m4 are calculated for the respective wheels 30-36. The slope value at each wheel is an approximation of the slope of the ground relative to the vehicle chassis in the direction of vehicle movement at the points of contact between each vehicle wheel and the ground. FIGS. 7a through 7c each represent a separate and individual embodiment that can be used to calculate the slope values m1, m2, m3 and m4. The control logic to calculate the slope value for each wheel is carried out according to one of those embodiments, and thereafter, the flow of control passes next to step 150.

In Step 150 a decision is made as whether or not the sum of m1 plus m4 is greater than the sum of m2 plus m3. If a decision is made that the sum of m1 plus m4 is greater than the sum of m2 plus m3 then flow of control passes next to step 160. If a decision is made that the sum of m1 plus m4 is not greater than the sum of m2 plus m3 then flow of control passes next to step 180.

It is of note that the decision in step 150 is the determination of what direction the platform (chassis) supporting forces should be shifted to minimize the energy required to move the vehicle forward. This step determines if it would be advantageous to take force away from the front right and back left wheel actuators and add that force to the front left and back right wheel actuators or vice versa.

In Step 160 the maximum shift force MSF is set. The maximum shift force MSF is set equal to the minimum of A1 and A4. It is of note that this will result in actuator forces A1 or A4 being calculated and set equal to zero in step 200. In other embodiments it may be desirable to reduce or limit the amount of force that is shifted. This can be accomplished by reducing or limiting the maximum shift force MSF. Flow of control passes next to step 170.

Step 170 calculates the shifted forces S1, S2, S3, and S4 for the respective wheels 30-36. The control logic to calculate the shifted force for each wheel is carried out according to the following equations, and thereafter, the flow of control passes next to step 200.

$$S1=-1(MSF)$$

$$S2=MSF$$

$$S3=MSF$$

$$S4=-1(MSF)$$

In Step 180 the maximum shift force MSF is calculated. The maximum shift force MSF is set equal to the minimum of A2 and A3. It is of note that this will result in actuator force A2 or A3 being calculated and set equal to zero in step 200. In other embodiments it may be desirable to reduce or limit the amount of force that is shifted. This can be accomplished by reducing or limiting the maximum shift force MSF. Flow of control passes next to step 190.

Step 190 calculates the shifted forces S1, S2, S3, and S4 for the respective wheels 30-36. The control logic to calculate the shifted force for each wheel is carried out according to the following equations, and thereafter, the flow of control passes next to step 200.

$$S1=MSF$$

$$S2=-1(MSF)$$

$$S3=-1(MSF)$$

$$S4=MSF$$

Step 200 calculates the actuator forces A1, A2, A3 and A4 for the respective wheels. The control logic to calculate the actuator force for each wheel is carried out according to the following equations, and thereafter the flow of control passes next to step 210

$$A1=CF1+S1$$

$$A2=CF2+S2$$

$$A3=CF3+S3$$

$$A4=CF4+S4$$

In Step 210 the CPU 102 sends the actuator forces A1, A2, A3 and A4 for the respective wheels to the output module 106 (FIG. 5). The output module 106 drives the hydraulic control valves 86-92 (10FR, 10FL, 10BR, and 10BL) to produce the desired pounds force at the associated actuators 22-28 (4FR, 4FL, 4BR, and 4BL) (FIG. 4). Flow of control passes next to Step 30 and the process is repeated.

FIG. 7a is one embodiment of how the slope values m1, m2, m3 and m4 at the several wheels are calculated in Step 130.

Step 300 calculates the approximate vertical forces VF1, VF2, VF3 and VF4 for the respective wheels 30-36. In the equation below UW1, UW2, UW3 and UW4 represent predetermined constants equivalent to the un-sprung weight of the associated wheel assembly. The vertical force for each wheel is equal to the sum of that wheel's actuator force Ax and un-sprung weight UWx. The control logic to calculate the vertical force for each wheel is carried out according to the following equations, and thereafter, the flow of control passes next to step 310.

$$VF1=A1+UW1$$

$$VF2=A2+UW2$$

$$VF3=A3+UW3$$

$$VF4=A4+UW4$$

Step 310 calculates the slope values m1, m2, m3 and m4 for the respective wheels 30-36. The slope value of each wheel is an approximation of the slope of the ground/pathway relative to the vehicle chassis in the direction of vehicle movement at the points of contact between each vehicle wheel and the ground/pathway. The slope value for each wheel is a ratio of the longitudinal force Lx for each wheel 30-36 to the vertical force VFx of the same wheel. This ratio tells how much resistance to forward travel force is induced for each pound of vertical force that is applied to a corresponding wheel. The control logic to calculate the slope for each wheel is carried out according to the following equations, and thereafter, the flow of control passes next to step 150 and the above described process continues.

$$m1=L1/VF1$$

$$m2=L2/VF2$$

$$m3=L3/VF3$$

$$m4=L4/VF4$$

FIG. 7b is another embodiment or how the slope value m1, m2, m3 and m4 at each wheel is calculated.

Step 400 calculates the change in vertical wheel position $\Delta V1$, $\Delta V2$, $\Delta V3$ and $\Delta V4$ for the respective wheels 30-36. The changes in vertical wheel positions $\Delta V1$, $\Delta V2$, $\Delta V3$ and $\Delta V4$ are derived from monitoring the associated wheel ride heights R1, R2, R3 and R4 over the last 100 program cycles (200 milliseconds). The changes in vertical wheel positions $\Delta V1$, $\Delta V2$, $\Delta V3$ and $\Delta V4$ are measured in fractions of a meter with upward wheel movement being positive measurements and downward wheel movement being negative. Flow of control passes next to step 410.

Step 410 calculates the change in longitudinal vehicle position $\Delta LP$. The change in longitudinal vehicle position $\Delta LP$ is derived from monitoring the output of vehicle speed sensor 116 (FIG. 5) to determine how far the vehicle has traveled in the last 200 milliseconds. The change in longitudinal vehicle position $\Delta LP$ is measured in fractions of a meter with forward vehicle movement being a positive value and reverse vehicle movement being negative. Flow of control passes next to step 420.

Step 420 calculates the slope values m1, m2, m3 and m4 for the respective wheels 30-36. The slope value for each wheel is an approximation of the slope of the ground relative to the vehicle chassis in the direction of vehicle movement at the point of contact between each vehicle wheel and the ground. The control logic to calculate the slope value for each wheel is carried out according to the following equations, and thereafter, the flow of control passes next to step 150 and the above described process continues.

$$m1=\Delta V1/\Delta LP$$

$$m2=\Delta V2/\Delta LP$$

$$m3=\Delta V3/\Delta LP$$

$$m4=\Delta V4/\Delta LP$$

FIG. 7c is yet another embodiment showing how the slope values m1, m2, m3 and m4 are calculated.

In step 500 the slope values of the ground/pathway relative to the vehicle chassis in the direction of vehicle movement at the points of contact between each vehicle wheel and the ground/pathway are directly measured by a terrain mapping system such as a LIDAR or 3D camera system or the like, and slope values m1, m2, m3 and m4 for the respective wheels 30-36 are calculated as the rise of the relevant terrain over the run of the relevant terrain. Flow of control passes next to step 150 and the above described process continues.

The preceding description provides preferred exemplary embodiment(s) only, and is not intended to limit the scope, applicability, or configuration of the invention. Rather, the description of the preferred exemplary embodiment(s) is intended to provide those skilled in the art with an enabling description for implementing a preferred exemplary embodiment. It is to be understood that various changes may be made in the function and arrangement of elements without departing from the true spirit and scope of the invention set forth in the appended claims.

The invention claimed is:

1. An active drive energy management and suspension system for a vehicle having a vehicle chassis supported above at least four ground/pathway engaging vehicle wheels, comprising:
   a plurality of actuators, each adapted to exert a variable supporting force between an associated vehicle wheel and the vehicle chassis;
   means for determining the slopes of the ground/pathway relative to the vehicle in the direction of vehicle movement at the points of contact between each vehicle wheel and the ground/pathway, and for generating corresponding slope signals; and
   control means responsive to the inter-relationships of the respective slope signals, and in the event that such inter-relationships are evident of ground/pathway anomalies that can have an effect on the drive energy required to move the vehicle in the forward direction, the control means is operative to cause a first set of the actuators associated with a first set of diametrically opposite wheels to decrease the supporting forces exerted thereby, and to simultaneously increase the supporting forces exerted by a second set of actuators associated with a second set of diametrically opposite wheels, each said supporting force included in the first set of supporting forces being decreased by an equal amount of force, and each supporting force included in the second set of supporting forces being increased by said equal amount of force, thereby reducing the energy otherwise required to drive the vehicle in said direction of vehicle movement and over the ground/pathway anomaly or anomalies.

2. An active drive energy management and suspension system according to claim 1, wherein the first set of diametrically opposite supporting forces corresponds to the set of diametrically opposite slope signals having the highest summed value.

3. An active drive energy management and suspension system according to claim 2, wherein said means for determining the slopes
   measures generally longitudinal motion resistive force components in the direction of vehicle movement of each vehicle wheel,
   measures corresponding generally vertical supporting force components at each vehicle wheel; and
   determines the slope of the ground/pathway relative to the vehicle in the direction of vehicle movement at the point of contact between each vehicle wheel and the ground/pathway by dividing each associated wheel longitudinal force component by the corresponding vertical force component.

4. An active drive energy management and suspension system according to claim 2, wherein said means for determining the slopes comprises:
   means for determining the speed of the vehicle and for generating a corresponding rate of forward movement signal;
   means for determining the rate of change of the distance between each vehicle wheel and the vehicle chassis, and for generating corresponding ride height rate of change signals; and
   means for estimating the slope of the ground/pathway relative to the vehicle in the direction of vehicle movement at the point of contact between each vehicle wheel and the ground/pathway by dividing each associated wheel ride height rate of change signal by the vehicle rate of forward movement signal.

5. An active drive energy management and suspension system according to claim 2, wherein said means for determining the slopes comprises:
   a LIDAR or 3D camera system for determining the slopes of the ground/pathway relative to the vehicle in the direction of vehicle movement at the points of contact between each vehicle wheel and the ground/pathway.

6. An active drive energy management and suspension system as recited in claim 1, wherein said means for determining the slopes;
   measures generally longitudinal motion resistive force components in the direction of vehicle movement of each vehicle wheel,
   measures corresponding generally vertical supporting force components at each vehicle wheel; and
   determines the slope of the ground/pathway relative to the vehicle in the direction of vehicle movement at the point of contact between each vehicle wheel and the ground/pathway by dividing each associated wheel longitudinal force component by the corresponding vertical force component.

7. An active drive energy management and suspension system according to claim 1 wherein said means for determining the slopes comprises:
   means for determining the speed of the vehicle and for generating a corresponding rate of forward movement signal;
   means for determining the rate of change of the distance between each vehicle wheel and the vehicle chassis, and for generating corresponding ride height rate of change signals; and
   means for estimating the slope of the ground/pathway relative to the vehicle in the direction of vehicle movement at the point of contact between each vehicle wheel and the ground/pathway by dividing each associated wheel ride height rate of change signal by the vehicle rate of forward movement signal.

8. A method of managing the energy required to drive a vehicle over ground/pathway anomalies, such vehicle having a vehicle chassis supported above at least four ground engaging vehicle wheels, comprising the steps of:
   providing a plurality of actuators each of which is adapted to exert a variable supporting force between an associated vehicle wheel and the vehicle chassis; determining the slopes of the ground/pathway relative to the vehicle at the points of contact between each vehicle wheel and the ground/pathway to detect encountered ground/pathway anomalies, and generating corresponding slope signals; and
   using inter-relationships of the respective slope signals to cause a first set of the actuators associated with a first set of diametrically opposite wheels to decrease the supporting forces exerted thereby, and to cause a second set of the actuators associated with a second set of diametrically opposite wheels to simultaneously increase the supporting forces exerted thereby, each supporting force included in said first set of supporting forces being decreased by an equal value, and each supporting force included the second set of supporting forces being increased by said equal value, thereby reducing the drive energy otherwise required to overcome the ground/pathway anomalies.

9. A method of managing the energy required to drive a vehicle over ground/pathway anomalies as recited in claim 8, wherein said first set of diametrically opposite supporting forces corresponds to the set of diametrically opposite slope signals having the highest summed slope signal value.

10. A method of managing the energy required to drive a vehicle over ground/pathway anomalies as recited in claim 9, and further comprising:
  determining the speed of the vehicle and generating a corresponding rate of forward movement signal;
  determining the rate of change of the separation between each vehicle wheel and the vehicle chassis due to the change in supporting force and any detected anomaly, and generating corresponding ride height rate of change signals; and
  estimating the slope of the ground/pathway relative to the vehicle in the direction of vehicle movement at the point of contact between each vehicle wheel and the ground/pathway by dividing each associated wheel ride height rate of change signal by the vehicle rate of forward movement signal.

11. A method of managing the energy required to drive a vehicle over ground/pathway anomalies as recited in claim 9, wherein the step of determining the slopes of the ground/pathway relative to the vehicle in the direction of vehicle movement at the point of contact between each vehicle wheel and the ground/pathway is accomplished using a LIDAR or 3D camera system.

12. A method of managing the energy required to drive a vehicle over ground/pathway anomalies as recited in claim 9, wherein said step of determining the slopes of the ground/pathway relative to the vehicle at the points of contact between each vehicle wheel and the ground/pathway includes;
  measuring generally longitudinal motion resistive force components in the direction of vehicle movement of each vehicle wheel, and
  estimating the slope of the ground/pathway relative to the vehicle in the direction of vehicle movement at the point of contact between each vehicle wheel and the ground/pathway by dividing the longitudinal force component associated with each wheel by the vertical force exerted by a corresponding actuator.

13. A method of managing the energy required to drive a vehicle over ground/pathway anomalies as recited in claim 9, wherein said step of determining the slopes of the ground/pathway relative to the vehicle at the points of contact between each vehicle wheel and the ground/pathway includes;
  measuring generally longitudinal motion resistive force components in the direction of vehicle movement of each vehicle wheel, and
  estimating the slope of the ground/pathway relative to the vehicle in the direction of vehicle movement at the point of contact between each vehicle wheel and the ground/pathway by dividing the longitudinal force component associated with each wheel by the vertical force exerted by a corresponding actuator.

14. A method of managing the energy required to drive a vehicle over ground/pathway anomalies as recited in claim 8, wherein said step of determining the slopes of the ground/pathway relative to the vehicle at the points of contact between each vehicle wheel and the ground/pathway includes;
  measuring generally longitudinal motion resistive force components in the direction of vehicle movement of each vehicle wheel, and
  estimating the slope of the ground/pathway relative to the vehicle in the direction of vehicle movement at the point of contact between each vehicle wheel and the ground/pathway by dividing the longitudinal force component associated with each wheel by the vertical force exerted by a corresponding actuator.

15. An active drive energy management and suspension system for a vehicle having a vehicle chassis supported above at least four ground/pathway engaging vehicle wheels, comprising:
  a plurality of actuators, each adapted to exert a variable supporting force between an associated vehicle wheel and the vehicle chassis;
  means for determining ground/pathway anomalies encountered by one or more of the wheels, and for generating corresponding ground/pathway indicator signals; and
  control means responsive to inter-relationships of the respective indicator signals, and in the event that the inter-relationships are evident of ground/pathway anomalies that can have an effect on the drive energy required to move the vehicle in the forward direction, the control means is operative to cause a first set of the actuators associated with a first set of diametrically opposite wheels to decrease the supporting forces exerted thereby, and to simultaneously increase the supporting forces exerted by a second set of actuators associated with a second set of diametrically opposite wheels, each said supporting force included in the first set of supporting forces being decreased by an equal amount of force, and each said supporting force included in the second set of supporting forces being increased by said equal amount of force, thereby reducing the energy otherwise required to drive the vehicle in said direction of vehicle movement and over the ground/pathway anomaly or anomalies.

16. An active drive energy management and suspension system as recited in claim 15, wherein said first set of diametrically opposite supporting forces corresponds to the set of diametrically opposite indicator signals having the highest summed value.

17. An active drive energy management and suspension system as recited in claim 16, wherein said means for determining ground/pathway anomalies;
  measures generally longitudinal motion resistive force components in the direction of vehicle movement of each vehicle wheel,
  measures corresponding generally vertical supporting force components at each vehicle wheel; and
  uses the indicator signals to determine the slopes of the ground/pathway relative to the vehicle in the direction of vehicle movement at the points of contact between each vehicle wheel and the ground/pathway by dividing each associated wheel longitudinal force component by the corresponding vertical force component.

18. An active drive energy management and suspension system according to claim 16 wherein said means for determining ground/pathway anomalies comprises:
  a LIDAR or 3D camera system for determining the slopes of the ground/pathway relative to the vehicle in the direction of vehicle movement at the points of contact between each vehicle wheel and the ground/pathway.

19. An active drive energy management and suspension system as recited in claim 15, wherein said means for determining the slopes;
- measures generally longitudinal motion resistive force components in the direction of vehicle movement of each vehicle wheel,
- measures corresponding generally vertical supporting force components at each vehicle wheel; and
- determines the slope of the ground/pathway relative to the vehicle in the direction of vehicle movement at the point of contact between each vehicle wheel and the ground/pathway by dividing each associated wheel longitudinal force component by the corresponding vertical force component.

20. An active drive energy management and suspension system according to claim 16 wherein said means for determining ground/pathway anomalies comprises:
- means for determining the speed of the vehicle and for generating a corresponding rate of forward movement signal;
- means for determining the rate of change of the distance between each vehicle wheel and the vehicle chassis, and for generating corresponding ride height rate of change signals; and
- means for estimating the slopes of the ground/pathway relative to the vehicle in the direction of vehicle movement at the point of contact between each vehicle wheel and the ground/pathway by dividing each associated wheel ride height rate of change signal by the vehicle rate of forward movement signal.

* * * * *